US008548150B2

(12) United States Patent
Creamer et al.

(10) Patent No.: US 8,548,150 B2
(45) Date of Patent: Oct. 1, 2013

(54) LOCATION RELEVANT DIRECTORY ASSISTANCE

(75) Inventors: Thomas E. Creamer, Boca Raton, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 2066 days.

(21) Appl. No.: 10/852,910

(22) Filed: May 25, 2004

(65) Prior Publication Data

US 2005/0265540 A1 Dec. 1, 2005

(51) Int. Cl.
*H04M 3/42* (2006.01)
*H04M 7/00* (2006.01)

(52) U.S. Cl.
USPC ............ 379/218.01; 379/201.01; 379/219; 379/220.01

(58) Field of Classification Search
USPC ............ 379/207.12, 218.01, 93.23, 114.29, 379/167.08, 173, 207.13, 207.14, 221.14; 455/414.1; 370/352, 353, 354
See application file for complete search history.

(56) References Cited

U.S. PATENT DOCUMENTS

| | | | |
|---|---|---|---|
| 5,724,412 A * | 3/1998 | Srinivasan | 379/93.23 |
| 6,813,346 B2 * | 11/2004 | Gruchala et al. | 379/211.01 |
| 2002/0160766 A1 * | 10/2002 | Portman et al. | 455/422 |
| 2002/0163999 A1 * | 11/2002 | Farris et al. | 379/88.02 |
| 2003/0231755 A1 * | 12/2003 | Akhteruzzaman et al. | 379/218.01 |
| 2004/0023644 A1 * | 2/2004 | Montemer | 455/414.1 |
| 2004/0161092 A1 * | 8/2004 | Fan et al. | 379/207.12 |
| 2004/0161093 A1 * | 8/2004 | Cox et al. | 379/218.01 |
| 2004/0165711 A1 * | 8/2004 | Sabinson et al. | 379/216.01 |
| 2004/0167092 A1 * | 8/2004 | Bountra et al. | 514/46 |
| 2004/0209640 A1 * | 10/2004 | Urban et al. | 455/550.1 |
| 2004/0240639 A1 * | 12/2004 | Colson et al. | 379/88.18 |

* cited by examiner

*Primary Examiner* — Khai N Nguyen
(74) *Attorney, Agent, or Firm* — Steven M. Greenberg, Esq.; Carey, Rodriguez, Greenberg & O'Keefe

(57) ABSTRACT

A method for location relevant directory assistance through a PSTN is provided. The method can include connecting a calling party with a called party through a switch in a PSTN, receiving a directory assistance request from the calling party over the PSTN, and querying a database disposed within the PSTN to retrieve caller identification for the calling party. The method can further include retrieving from over a data communications network separate from the PSTN a call address in response to the querying of the database for the calling party from the database disposed within the PSTN. Location relevant directory information can be identified from a database that is external to the PSTN based upon the retrieved call address. Subsequently, the directory assistance request can be responded to using the identified location relevant directory information.

4 Claims, 3 Drawing Sheets

LOCATION RELEVANT DIRECTORY ASSISTANCE

BACKGROUND OF THE INVENTION

1. Statement of the Technical Field

The present invention relates to delivering directory assistance services to a telephone subscriber, and more particularly to providing location relevant directory assistance services in a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs)—databases containing service logic and subscriber information—which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center. For instance, in a directory assistance system, generally a calling party can be prompted for a preferred locale prior to conducting a lookup for a specified party. The specified locale can be used to limit the lookup to particular numbers falling within the specified locale. Of course, in many cases the caller will not know off-hand a suitable locale for limiting the locale. Moreover, in select circumstances, multiple phone numbers may exist for a lookup and a geographically proximate phone number may be preferred.

SUMMARY OF THE INVENTION

The present invention addresses the deficiencies of the art in respect to providing geographically precise directory assistance and provides a novel and non-obvious method for location relevant directory assistance through the PSTN. In accordance with the present invention, a method for providing location relevant directory assistance in a PSTN can include connecting a calling party with a called party through a switch in a PSTN, receiving a directory assistance request from the calling party over the PSTN, and querying a database disposed within the PSTN to retrieve caller identification for the calling party. The method can further include retrieving from over a data communications network separate from the PSTN a call address in response to the querying of the database for the calling party from the database disposed within the PSTN. Location relevant directory information can be identified from a database that is external to the PSTN based upon the retrieved call address. Subsequently, the directory assistance request can be responded to using the identified location relevant directory information.

In a preferred aspect of the invention, the method further can include the steps of prompting the calling party with the identified location relevant directory information. In response, a selection from the calling party from among the identified location relevant directory information can be received from the calling party. Consequently, the responding step can be performed using the selection. Alternatively, the responding step can be performed without location restriction if the calling party does not select from among the identified location relevant directory information.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for location relevant directory assistance. In accordance with the present invention, the location of a calling party can be determined in the PSTN. Using the location of the calling party, lookup requests can be constrained to phone numbers associated with the location of the calling party. In this regard, the lookup requests can be constrained to a specific locale, or to locales within proximity to the locale of the calling party. In this way, more pertinent, relevant information can be provided to the calling party as part of a directory assistance request by relying upon known and accessible locale information disposed within the PSTN.

Figure 1:
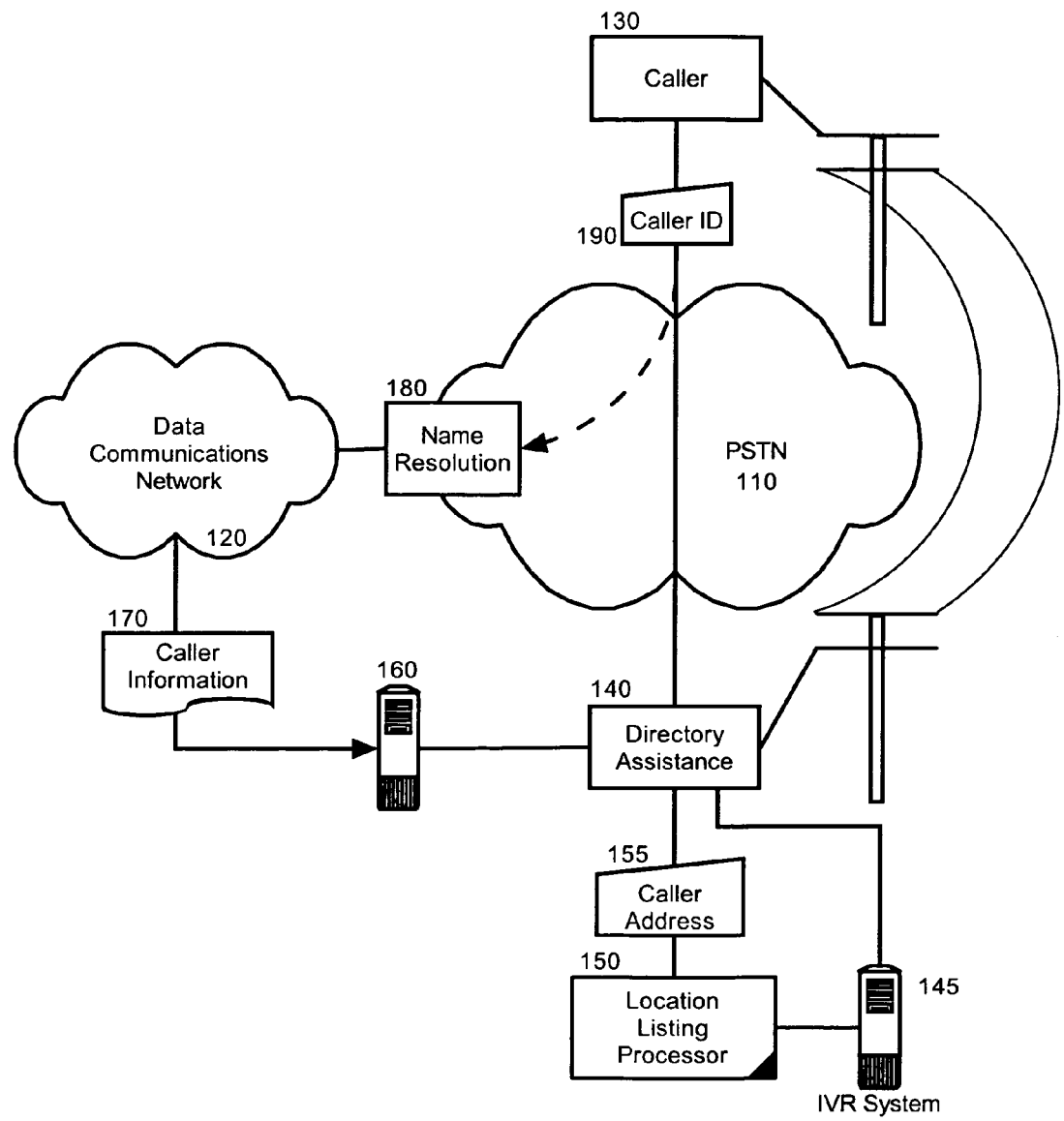
FIG. 1 is a block diagram illustrating a process for providing location relevant directory assistance through a PSTN according to the inventive arrangements.

In further illustration, FIG. 1 is a block diagram illustrating a process for providing location relevant directory assistance through a PSTN according to the inventive arrangements. Specifically, a caller 130 can be coupled telephonically to a directory assistance system 140 by way of the PSTN 110. The directory assistance system 140 can be configured to process lookup requests for callers and to provide telephone numbers in response to the lookup requests. Preferably, the lookup requests and responses can be provided audibly through the operation of an interactive voice response system 145, although the invention is not so limited to the precise arrangement shown in FIG. 1 to include the interactive voice response system 145. Finally, the directory assistance system 140 can include a location listing processor configured to constrain lookup operations in the directory assistance system based upon address information.

In operation, as the caller 130 initiates the telephone call in the PSTN 110, a name resolution adapter 180 disposed within the PSTN 110 can capture caller identifying data 190 for the telephone used by the caller 130 in order to identify the caller 130. Using the caller identifying data 190, the name resolution adapter 180 can produce specific identification data for the caller 130, for instance a name, address, phone number, credit card number, or account number, to name a few. In this regard, the name resolution adapter 180 can query one or more databases disposed within the PSTN 110, including a LIDB, to obtain the specific identification data based upon the caller identifying data 190.

When the specific identification data has been acquired, the specific information can be encapsulated in a caller information message 170 and provided to an enterprise application 160 associated with the directory assistance system 140 over the data communications network 120. Concurrently, the call between the caller 130 and the directory assistance system 140 can be established over the PSTN 110. Importantly, using the caller information 170, a call address 155 can be determined and provided to the location listing processor 150. The location listing processor 150 in turn can constrain any lookup requested by the caller 130 to phone numbers at addresses in proximity to the locale indicated by the caller address 150.

Figure 2:
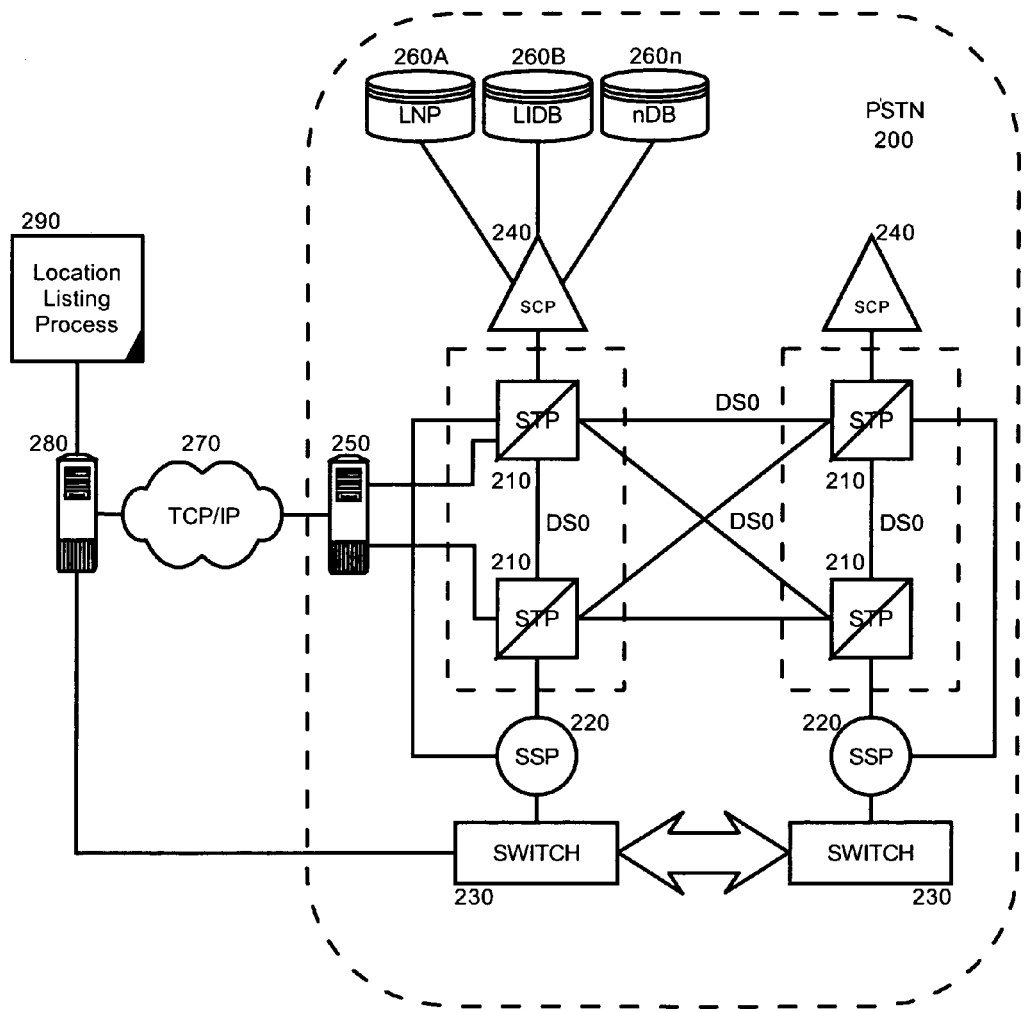
FIG. 2 is a schematic illustration of a system for providing location relevant directory assistance utilizing identifying information acquired within the PSTN; and, FIG. 3 is a flow chart illustrating a process for providing location relevant directory assistance in the system of FIG. 2.

To further illustrate the preferred embodiments of the present invention, FIG. 2 is a schematic illustration of a system for providing location relevant directory assistance using identifying information acquired within the PSTN. As shown in FIG. 2, a system for providing location relevant directory assistance using identifying information acquired within a PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

Figure 3:
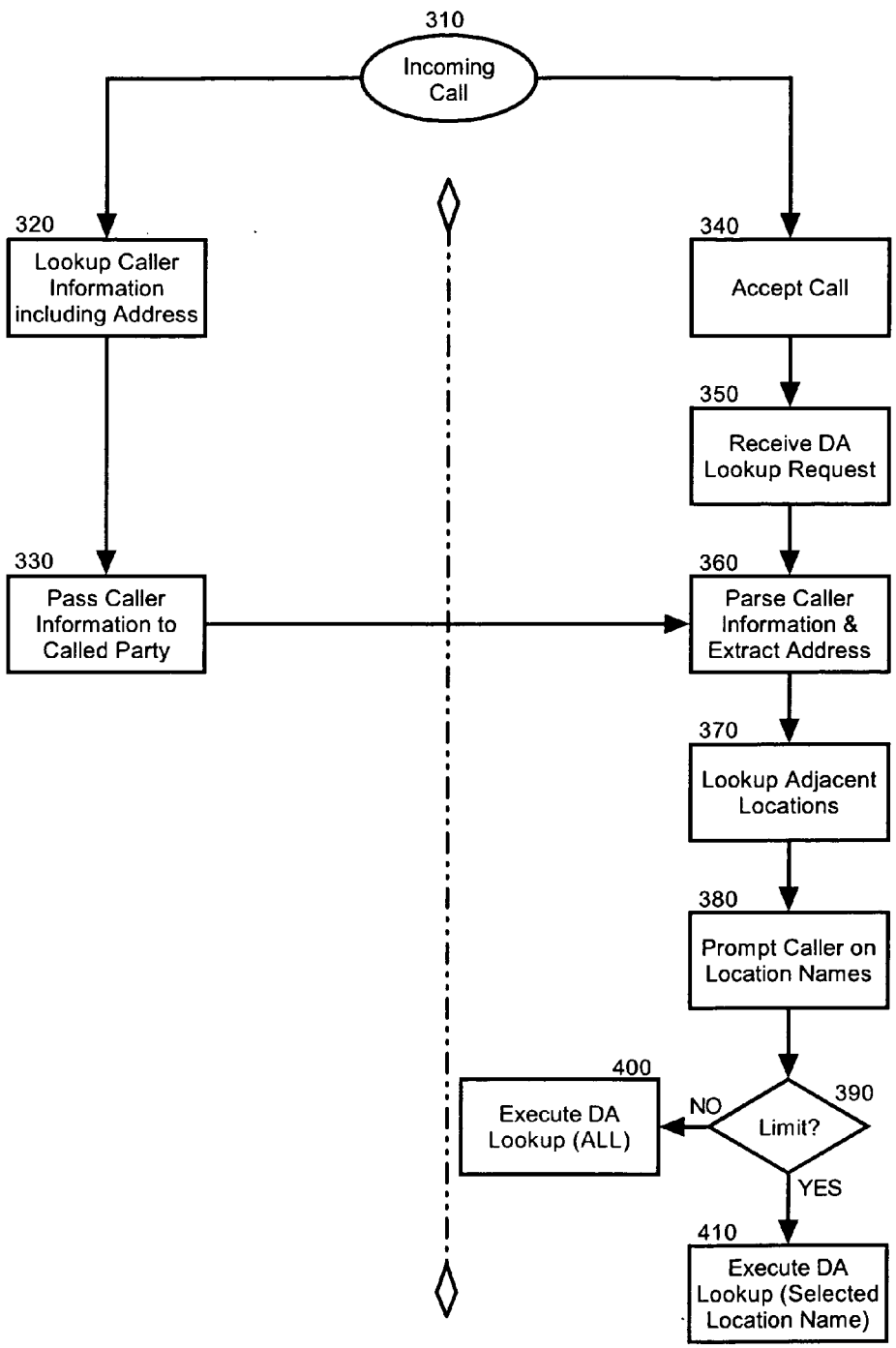

In a preferred aspect of the present invention, location listing logic 290 can be coupled to the enterprise application 280. The location listing logic 290 can be configured to resolve the location of a caller based upon location information disposed within the identity information provided by the name resolution adapter 250. In further illustration, FIG. 3 is a flow chart illustrating a process for delivering location relevant directory assistance in the system of FIG. 2. As shown in FIG. 3, beginning in block 310, an incoming call can be detected in the PSTN and processed in the directory assistance system. In this regard, the incoming call can be processed in a switch in the PSTN in block 320 concurrently with the connection of the incoming call to the called party in block 340.

Specifically, within the PSTN, in block 320 caller information can be determined for the incoming call through a query to one or more databases in the PSTN. The caller information can include location information for the incoming call such as an address of the telephone subscriber associated with the telephone number originating the incoming call. In block 330, the caller information can be passed to the called party over a data communications network. By comparison, within the directory assistance system in block 350 a directory assistance request can be received and in block 360, the caller information received from the PSTN can be parsed to extract the address of the calling party.

In block 370, locations relevant to the address can be determined through a suitable query to a data store of locations, including locations proximate to or associated with the address. As such, in block 380 the caller can be prompted to select zero or more of the determined locations in processing the directory assistance request. In decision block 390, if the caller does not choose to limit the directory assistance request in response to the prompt, the directory assistance request can be processed normally without restriction in block 400. Otherwise, in block 410 the directory assistance request can be processed utilizing the selected locations. For instance, only those phone numbers associated with addresses within the selected locations may be presented to the caller.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for providing location relevant directory assistance in a public switched telephone network (PSTN), the method comprising the steps of:

using a switch, connecting a calling party with a called party through the switch in the PSTN;

receiving a directory assistance request from the calling party over the PSTN;

querying a database disposed within the PSTN to retrieve caller identification for the calling party;

retrieving from over a data communications network separate from the PSTN a call address in response to the querying of the database for said calling party from the database disposed within the PSTN;

identifying location relevant directory information from a database that is external to the PSTN based upon said retrieved call address; and, responding to said directory assistance request using said identified location relevant directory information.

2. The method of claim 1, further comprising the steps of:

prompting said calling party with said identified location relevant directory information;

receiving a selection from said calling party from among said identified location relevant directory information; and, performing said responding step using said selection.

3. The method of claim 2, further comprising the step of performing said responding step without location restriction if said calling party does not select from among said identified location relevant directory information.

4. The method of claim 1, wherein said retrieving step comprises the steps of querying a line item database (LIDB) through a name resolution adapter disposed in the PSTN for names associated with said identifying information.

* * * * *